United States Patent
De Vries et al.

(10) Patent No.: US 7,648,559 B2
(45) Date of Patent: Jan. 19, 2010

(54) METHOD FOR FRACTIONAL CRYSTALLISATION OF A METAL

(75) Inventors: Paul Alexander De Vries, GM Heemstede (NL); Huibrecht Adriaan Wouters, MB Leiden (NL)

(73) Assignee: Aleris Switzerland GmbH c/o K+P Treuhangesellschaft, Schaffhausen (CH)

(*) Notice: Subject to any disclaimer, the term of this patent is extended or adjusted under 35 U.S.C. 154(b) by 375 days.

(21) Appl. No.: 10/516,888

(22) PCT Filed: Jun. 27, 2003

(86) PCT No.: PCT/EP03/06902
§ 371 (c)(1), (2), (4) Date: Dec. 3, 2004

(87) PCT Pub. No.: WO2004/005559
PCT Pub. Date: Jan. 15, 2004

(65) Prior Publication Data
US 2005/0178239 A1    Aug. 18, 2005

(30) Foreign Application Priority Data
Jul. 5, 2002    (EP) .................................. 02077683

(51) Int. Cl.
*C22B 9/02*    (2006.01)
*C22B 21/06*   (2006.01)

(52) U.S. Cl. .......................................... 75/588; 75/679

(58) Field of Classification Search ................ 75/10.11, 75/588, 679
See application file for complete search history.

(56) References Cited

U.S. PATENT DOCUMENTS

| 1,562,090 | A |   | 11/1925 | Hoopes |
|-----------|---|---|---------|--------|
| 1,938,101 | A | * | 12/1933 | Hall .......................... 75/589 |
| 3,211,547 | A |   | 10/1965 | Jarrett et al. |
| 3,296,811 | A |   | 1/1967  | Stoller |
| 3,303,019 | A |   | 2/1967  | Jacobs |
| 3,308,666 | A |   | 3/1967  | Anderson et al. |
| 3,671,229 | A |   | 6/1972  | Ferber et al. |

(Continued)

FOREIGN PATENT DOCUMENTS

DE    0258283    7/1988

(Continued)

OTHER PUBLICATIONS

English translation of JP 07-07066, translation date May 2007.*

(Continued)

*Primary Examiner*—George Wyszomierski
*Assistant Examiner*—Tima M McGuthry-Banks
(74) *Attorney, Agent, or Firm*—Novak Druce + Quigg LLP

(57) ABSTRACT

The invention relates to a method for fractional crystallization of an at most partially solidified molten metal, in which a layer of at most partially solidified molten metal having an upper surface and a lower surface is divided into a series of compartments communicating with each other, in which the metal is stirred in at least some of the compartments, and in which crystals formed and/or existing in the layer of metal are selectively transported in a predetermined direction and molten metal is selectively transported in the opposite direction.

18 Claims, 1 Drawing Sheet

U.S. PATENT DOCUMENTS

Figure 1:
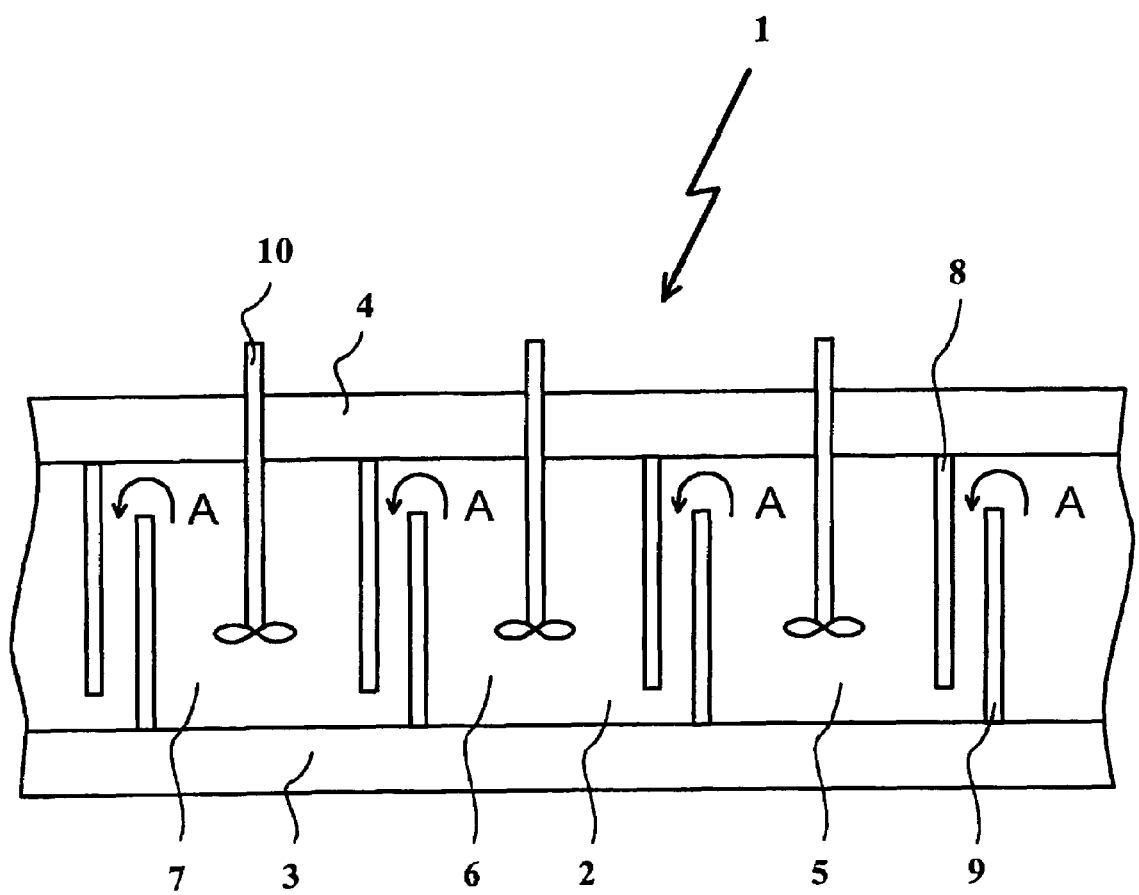

| | | | |
|---|---|---|---|
| 3,839,019 A | 10/1974 | Bruno et al. |
| 3,840,219 A | 10/1974 | Sheridan et al. |
| 3,840,364 A | 10/1974 | Flemmings et al. |
| 3,849,119 A | 11/1974 | Bruno et al. |
| 4,043,802 A | 8/1977 | Esdaile et al. |
| 4,050,683 A | 9/1977 | Langhammer |
| 4,099,965 A | 7/1978 | Beguin et al. |
| 4,133,517 A | 1/1979 | Esdaile et al. |
| 4,222,830 A | 9/1980 | Dawless et al. |
| 4,239,606 A | 12/1980 | Dawless et al. |
| 4,243,211 A | 1/1981 | Leroy et al. |
| 4,273,627 A | 6/1981 | Dawless et al. |
| 4,305,763 A | 12/1981 | Quist et al. |
| 4,379,718 A | 4/1983 | Grantham et al. |
| 4,411,747 A | 10/1983 | Dawless et al. |
| 4,456,480 A | 6/1984 | Wintenberger |
| 4,581,062 A | 4/1986 | Boutin |
| 4,736,314 A | 4/1988 | Riese et al. |
| 4,744,823 A | 5/1988 | Raymond-Seraille |
| 4,781,771 A | 11/1988 | Masumoto et al. |
| 5,057,150 A | 10/1991 | Reeve et al. |
| 5,160,532 A | 11/1992 | Benz et al. |
| 5,221,377 A | 6/1993 | Hunt, Jr. et al. |
| 5,312,498 A | 5/1994 | Anderson |
| 5,405,427 A | 4/1995 | Eckert |
| 5,427,602 A | 6/1995 | DeYoung et al. |
| 5,741,348 A | 4/1998 | Van Der Donk et al. |
| 5,968,223 A | 10/1999 | Eckert |
| 6,143,070 A | 11/2000 | Bliss et al. |
| 6,224,648 B1 | 5/2001 | Verdoes et al. |
| 6,290,900 B1 | 9/2001 | Hatano et al. |
| 6,355,085 B1 | 3/2002 | Pillin et al. |
| 6,909,505 B2 | 6/2005 | Lucas et al. |
| 6,972,110 B2 | 12/2005 | Chakrabarti et al. |
| 7,419,530 B2 | 9/2008 | De Vries et al. |
| 7,442,228 B2 | 10/2008 | De Vries |
| 7,531,023 B2 | 5/2009 | De Vries et al. |
| 7,537,639 B2 | 5/2009 | De Vries et al. |
| 2001/0031823 A1 | 10/2001 | Atchetee et al. |
| 2002/0121319 A1 | 9/2002 | Chakrabarti et al. |
| 2004/0261572 A1 | 12/2004 | De Vries |
| 2005/0039578 A1 | 2/2005 | De Vries et al. |
| 2005/0145071 A1 | 7/2005 | Cates |
| 2005/0178239 A1 | 8/2005 | De Vries et al. |
| 2006/0162491 A1 | 7/2006 | De Vries et al. |
| 2007/0023110 A1 | 2/2007 | De Vries et al. |
| 2007/0272057 A1 | 11/2007 | De Vries et al. |

FOREIGN PATENT DOCUMENTS

| | | |
|---|---|---|
| DE | 4325793 | 2/1995 |
| EP | 0099948 | 2/1984 |
| EP | 0375308 | 6/1990 |
| EP | 0587274 | 3/1994 |
| EP | 0696646 A2 | 2/1996 |
| EP | 0745693 | 12/1996 |
| EP | 0829552 | 3/1998 |
| EP | 1288319 | 3/2003 |
| EP | 1380659 | 1/2004 |
| FR | 1594154 | 6/1970 |
| GB | 615590 | 1/1949 |
| GB | 885503 | 12/1961 |
| GB | 974829 | 11/1964 |
| GB | 1352567 | 5/1974 |
| GB | 2154315 | 9/1985 |
| JP | 52135797 | 11/1977 |
| JP | 55050442 | 4/1980 |
| JP | 57152435 | 9/1982 |
| JP | 58104132 | 6/1983 |
| JP | 59028538 | 2/1984 |
| JP | 59205424 A * | 11/1984 |
| JP | 60234930 | 11/1985 |
| JP | 07-70666 * | 3/1995 |
| RU | 2105084 | 2/1998 |
| RU | 2112065 C1 | 5/1998 |
| SU | 1589173 | 8/1990 |
| WO | 98/27240 A1 | 6/1998 |
| WO | 02052053 | 7/2002 |
| WO | 2004005558 A1 | 1/2004 |
| WO | 2004005559 A1 | 1/2004 |
| WO | 2005095658 | 10/2005 |

OTHER PUBLICATIONS

Perry's Chemical Engineers' Handbook, seventh edition, McGraw-Hill, 1997, pp. 18-5 to 18-13.*

Isenberg-O'Loughlin, Jo, "Taming the Thunder," Metal Producing. vol. 33. pp. 21-23. Sep. 1994.*

Unpublished U.S. Appl. No. 10/598,731, DeVries, filed Sep. 8, 2006.

Fourth Int'l Symposium on Recycling of Metals and Engineered Materials TMS (The Minerals, Metals & Materials Society) 2000, pp. 979-991, Refining of a 5xxx Series Aluminum Alloy Scrap by ALCOA Fractional Crystallization Process, by Ali Unal.

Notice of Allowance, Mar. 18, 2008, for U.S. Appl. No. 10/488,042 to DeVries.

Office Action, May 11, 2007, for U.S. Appl. No. 10/488,042 to DeVries.

Office Action, Oct. 16, 2007, for U.S. Appl. No. 10/488,042 to DeVries.

Office Action, Dec. 3, 2007, for US Appl. No. 10/491,278 to DeVries.

Office Action, Jun. 26, 2007, for U.S. Appl. No. 10/491,278 to DeVries.

Office Action, Aug. 30, 2007, for U.S. Appl. No. 10/516,889 to DeVries et al.

Office Action, Jan. 31, 2008, for U.S. Appl. No. 10/516,889 to DeVries et al.

Hanumanth et al., "Particle Sedimentation During Processing of Liquid Metal-Matrix Composites", Metallurgical Transaction B., vol. 23B, pp. 753-763 (1992).

L.C. Bartel et al., An Electrical Resistivity Measurement in Molten Basalt During the 1983 Kilauea Eruption, Bull. Volcanol., vol. 46.3, pp. 271-276 (1983).

Notice of Allowance fo U.S. Appl. No. 10/488,042 mailed Jun. 2, 2008.

Final rejection for U.S. Appl. No. 10/516,889 mailed May 30, 2008.

Office Action of Sep. 9, 2008 for U.S. Appl. No. 11/492,226 to De Vries.

De Vries et al.-U.S. Appl. No. 10/577,354, "Method of Cooling Molten Metal During Fractional Crystallisation" Non-Final Office Action mailed Nov. 18, 2008.

Davis, J.R. (editor), ASM Specialty Handbook, Aluminum and Aluminum Alloys, pp. 207-216 (1993).

Patent Abstract of Japan vol. 007, No. 205 (C-185), Sep. 9, 1983.

Patent Abstract of Japan vol. 008, No. 114 (C-225), May 26, 1984.

Patent Abstract of Japan vol. 006, No. 257 (C-140), Dec. 16, 1982.

International Publication No. WO 2004/005558, filed in the US National Stage on Dec. 3, 2004 as U.S. Appl. No. 10/516,889 in the name of De Vries et al.

U.S. Appl. No. 12/304,293, filed Dec. 11, 2008 (unpublished), labeled WO 2007/147587, 10 pages.

U.S. Appl. No. 12/304,311, filed Dec. 11, 2008 (unpublished), labeled WO 2008/000341, 14 pages.

U.S. Appl. No. 12/306,023, filed Dec. 22, 2008 (unpublished), labeled WO 2008/003505, 21 pages.

U.S. Appl. No. 10/577,354 - Notice of Allowance mailed Mar. 5, 2009, 7 pages.

U.S. Appl. No. 10/598,731 - Notice of Allowance mailed Jan. 23, 2009, 7 pages.

* cited by examiner

METHOD FOR FRACTIONAL CRYSTALLISATION OF A METAL

This is the U.S. National Stage of Patent Cooperation Treaty application No. PCT/EP2003/006902 having an international filing date of 27 Jun. 2003 and claiming priority from European patent application No. 02077683.7 filed 5 Jul. 2002. The invention relates to a method for fractional crystallisation of a molten metal.

Crystallisation methods and apparatus are used to refine a metal (here used as an abbreviation for metal alloy) in which too high a concentration of a foreign element is present. This foreign element can be present because in the metal made from metal ore, the primary metal, too much of the foreign element is present, or because already used metal is recycled and the foreign element concentration in the scrap is too high. For instance aluminum scrap can contain too much of the foreign elements Fe, Si or Mg for use for commercial purposes without mixing it with primary metal containing little of the foreign element.

When use is made of fractional crystallisation to refine the metal, crystals are formed in the molten metal during partial solidification of the molten metal, which crystals have a composition that is different from the composition of the molten metal that is used as a starting point.

The crystals formed in the molten metal during partial crystallisation of the molten metal are for instance refined as compared to the molten metal. The amount of refinement however depends on the type of the foreign element and the type of metal, and also on the quantity of foreign element present in the molten metal used as a starting point. One refinement step often is not enough to get a refined metal that is pure enough for commercial purposes.

It is an object of the invention to provide a method for fractional crystallisation of a metal with which a highly refined metal can be produced.

It is another object of the invention to provide a relatively simple method to refine metals by fractional crystallisation.

It is still another object of the invention to provide a method that can be used with a relatively simple apparatus.

It is a further object of the invention to provide such a method for continuous fractional crystallisation.

One or more of these objects are reached with a method for fractional crystallisation of an at most partially solidified molten metal, in which a layer of at most partially solidified molten metal having an upper surface and a lower surface is divided into a series of compartments communicating with each other, in which the metal is stirred in at least some of the compartments, and in which crystals formed and/or existing in the layer of metal are selectively transported in a predetermined direction and molten metal is selectively transported in the opposite direction.

Due to the presence of compartments in the layer of metal and the stirring of the metal in the compartments, the crystals formed and/or existing in the layer of metal remain in their compartment for some time. The stirring of the metal also results in the presence of a thin boundary layer around the crystals. Since the compartments communicate with each other, some of the crystals will be transported from one compartment to the other as a result of the selective transportation in the predetermined direction. In each compartment a further refinement can take place, resulting in highly refined crystals in the last compartment. To produce metal with a refinement that is that high, molten metal that is less refined must be transported in the direction opposite or counter current to the transportation of the crystals. The overall refinement and the yield of the method depend on the amount of molten metal in counter current.

Preferably a temperature difference is present over the length of the layer of metal, the higher temperature being present at the end of the metal layer to which the crystals are transported.

As a result of the temperature difference over the length of the layer, a relatively small temperature difference will exist between adjacent compartments. The temperature in the compartment to which the crystals are selectively transported will thus be higher than the temperature in the compartment from which the crystals are transported. In the compartment having the higher temperature the molten metal will be more refined. The crystals formed in this compartment will therefore be more refined than the former crystals. In each compartment in the direction into which the crystals are transported, the crystals will thus be more refined. Highly refined crystals and molten metal will thus exist at the end of the series of compartments in the predetermined direction of transport of the crystals. To form crystals in the layer of metal, the layer of metal has to be cooled in some way.

According to a preferred method the compartments in the layer of metal are formed by compartment walls that are present in pairs, the compartment walls of each pair being preferably placed adjacent to each other, one wall extending towards and adjacent to the lower surface of the layer of metal and the other wall extending from the lower surface of the layer of metal towards the upper surface of the layer of metal.

In this way crystals that are heavier than the molten metal will sink in the compartment, but due to the stirring of the metal some of the crystals in the compartment will fall into the next compartment, over the wall extending from the lower surface. The crystals cannot be transported in the other direction, so this measure results in a selective transport of the crystals in one direction. When crystals are transported in one direction through the layer of metal, molten metal has to flow in the opposite direction. If the compartment walls of a pair of compartment walls are placed adjacent to each other, as preferred, the molten metal has to flow between the pair of walls in the counter direction of the crystals, and relatively little molten metal can be transported with the crystals into the next compartment. In this way the molten metal in each compartment is kept as refined as possible.

Alternatively, the compartments in the layer of metal are formed by compartment walls that are present in pairs, the compartment walls of each pair being preferably placed adjacent to each other, one wall extending from the upper surface of the layer of metal towards the lower surface of the layer of metal and the other wall extending towards and adjacent to the upper surface of the layer of metal. This alternative should be used when the crystals formed and/or existing in the molten metal are lighter than the molten metal. This method is used in an analogous way.

The transport of crystals and molten metal between the pair of compartments walls can be optimised by the design and positioning of these walls. For example, the compartment walls can be placed at an angle relative to each other such that the distance between a pair of compartment walls increases in the direction of crystal transport. As a result, the velocity of the molten metal in counter current decreases and the velocity of the crystals increases between the pair of compartment walls, thus minimizing the risk of almost stationary crystals blocking further crystal transport.

According to another preferred method a layer of transporting liquid is present below and/or above the layer of metal to selectively transport the crystals, and the compartments in the layer of metal are formed by compartment walls extending towards and adjacent to the layer of transporting liquid transporting the crystals, preferably the transporting liquid being a molten salt.

As in the former preferred method, the crystals formed and/or existing in the layer of metal are kept in suspension by the stirring. Some of the crystals will sink or rise towards a layer of transporting liquid, which layer of transporting liquid will transport the crystals towards the next compartment. As a result the selective transportation is achieved. Here too the molten metal is transported in counter current and due to the compartment walls ending adjacent to the layer of transporting liquid transporting the crystals, relatively little molten metal can be transported with the crystals into the next compartment. A molten salt is preferably used as a transporting liquid because it will not react with molten metal and can withstand high temperatures.

According to still another preferred method, the layer of metal is present in a chamber having an inclined bottom, and the compartments in the layer of metal are formed by compartment walls extending towards and adjacent to the bottom of the chamber.

As above, the crystals are kept in suspension in the compartments due to the stirring of the molten metal. Some of the crystals sink to the inclined bottom, and due to the gravity these crystals are transported into the next lower compartment. Here the selective transport is achieved by the inclination of the bottom, and due to the compartment walls ending adjacent to the bottom relatively little molten metal is transported with the crystals into the lower compartment, but the molten metal is transported in counter current.

As an alternative to this last preferred method, the layer of metal is present in a chamber having an inclined upper wall, and the compartments in the layer of metal are formed by compartment walls extending towards and adjacent to the upper wall of the chamber. This alternative should be used when the crystals are lighter than the molten metal and rise in the compartments.

Preferably the compartment walls are adjustable such that the ends of the compartment walls are placed nearer to or further from the surface of the layer of metal they extend towards. In this way the transport of crystals can be restricted or increased, depending on the other process variables, the type of metal, et cetera.

According to a preferred method mixing means are present to stir the metal in at least some of the compartments, the mixing velocity of the mixing means being variable. The mixing velocity of the mixing means can be used to control the transport of the crystals from one compartment into the next compartment.

Preferably, molten metal and/or crystals are removed at the end of the layer of metal towards which the crystals are selectively transported. Here the refinement of the metal is highest. Of course unrefined molten metal has to be added and remaining molten metal, containing a higher amount of the foreign element, has to be removed.

Preferably the metal used is aluminum. Aluminum is one of the metals that are difficult and/or costly to refine by conventional methods. The method according to the invention is particularly suited for the fractional crystallisation of aluminum in a relatively easy and cost effective way.

The fractional crystallisation as described above is preferably used for removing one or more of the elements Fe, Ga, Mg, Mn, B, Si, Sn, Zn and Ni from the aluminum.

The invention will be elucidated referring to an exemplary embodiment, in view of the accompanying drawing.

FIG. 1 shows, in a schematic way, a cross section through a crystallisation apparatus for implementing the method according to the invention.

FIG. 1 shows a portion of a crystallisation apparatus 1 for the continuous crystallisation of molten metal containing one or more foreign elements, that is presently preferred for the purpose. The crystallisation apparatus has a chamber 2 with a bottom 3 and an upper wall 4, which are very well isolated as is known in the art, normally by special refractory materials.

In the chamber 2 compartments 5, 6, 7 are formed by compartment walls 8, 9 that are present in pairs. The compartment walls 8 are attached to the upper wall 4 and end adjacent to the lower wall. It would however be possible to place the high end of the compartment walls 8 some distance from the upper wall 4, dependant on the height of the chamber 2 and the type of metal to be crystallised. The compartment walls 9 are attached to the bottom 3 of the chamber 2 and end at a distance from the upper wall 4. The height of the compartment walls 9 depends on the metal to be crystallised and the process conditions during the crystallisation. In each compartment a mixing element 10 is present to stir the molten metal with the crystals formed and/or existing in the metal.

Only three compartments 5, 6, 7 are shown. It will be appreciated that the crystallisation apparatus will contain the number of compartments that is necessary for the desired refinement of a certain metal, depending on the amount of foreign element(s) that is/are present as starting point and the process conditions.

As always necessary for crystallisation the molten metal in the crystallisation apparatus has to be cooled. Cooling means to do so have not been shown but are known in the art.

The above described crystallisation apparatus can for instance be used for the continuous fractional crystallisation of aluminum containing 0.10% Si and 0.20% Fe (so-called P1020) to reach aluminum containing less than 0.01% Si and 0.01% Fe (so-called P0101).

For this crystallisation process chamber 2 of the crystallisation apparatus 1 has to have eight to ten compartments, each compartment having a size of approximately 500×500×500 mm$^3$, so the chamber has an inner size of approximately 4 à 5 m (length)×0.5 m (width)×0.5 m (height). The compartment walls 8 end approximately 80 to 100 mm from the bottom 3 and the compartment walls 9 are approximately 400 mm high. The height of the compartment walls 9 will however be dependant on the rotational velocity and the size of the mixing elements 10. The distance between the compartment walls 8 and 9 is approximately 80 mm.

The method according to the invention implemented for aluminum with the above apparatus is as follows.

Molten aluminum with P1020 composition is introduced into the apparatus through an inlet (not shown) at a temperature just above the crystallisation temperature of approximately 660° C. The molten aluminum in the chamber 2 is cooled using cooling means (not shown) to form crystals. These crystals contain less of the foreign elements Si and Fe and tend to slowly sink through the molten aluminum to the bottom 3.

The stirring action of the mixing elements 10 keeps the crystals in suspension. For instance in compartment 5 continuously some crystals move over the compartment wall 9 (see arrow A). This amount depends on the size of the crystals, the rotational velocity of the mixing element 10 and the height of the compartment wall 9. The crystals that move over the compartment wall 9 sink to the bottom 3 in compartment 6 because in between the compartment walls 8 and 9 the molten metal is not stirred. Once the crystals have sunk below the lower end of compartment wall 8, they will be swept up by the stirring action of the mixing element 10 in compartment 6. The crystals in compartment 6 are kept in suspension by the mixing element and continuously a certain amount of the crystals moves to compartment 7 in the same way.

In this way the crystals are selectively transported from the right-hand end of the apparatus to the left-hand end. Since crystals are transported to the left, molten metal has to move to the right through the apparatus. Because the distance between the compartment walls 8 and 9 is small, here the molten metal only moves upwards and effectively only crystals move downwards. In this way a counter current exists through the apparatus.

Over the length of the apparatus a temperature difference exists such that the temperature of the molten metal at the left-hand of the apparatus is higher than the temperature at the right-hand end of the apparatus as seen in FIG. 1. This means that for instance the temperature in compartment 6 is slightly higher than in compartment 5. A crystal formed or existing in compartment 5 will be more refined than the molten aluminum in which it is formed or present. When this crystal is transported to compartment 6 where the temperature is slightly higher, the crystal will partly or totally melt, which leads to a composition of the molten aluminum in compartment 6 that is more refined than the molten aluminum in compartment 5. In compartment 6 crystals will be formed again. The crystals formed in compartment 6 will thus be more refined than the crystals in compartment 5.

The same holds for all neighbouring compartments in the crystallisation apparatus 1, thus leading to very refined aluminum in the left-hand compartment of the apparatus, where the refined aluminum can be discharged. Due to the counter current aluminum containing a lot of Si and Fe can be discharged at the right-hand end of the apparatus of FIG. 1 as a by-product.

For the control of the crystallisation, the apparatus is preferably equipped with means to measure and control the solid fraction, the chemical composition and/or the temperature in the layer of metal.

With the above-described apparatus, a production of about 20 tons per day of aluminum with P0101 composition can be reached; the by-product will only be some 10% thereof.

It will be understood that many changes can be made or will be necessary depending on the metal used and the foreign element that has to be removed from it. For instance, if the crystals that are formed and/or present rise in the molten metal the compartment walls have to be placed upside down. It will also be possible to use other means for stirring the molten metal in the compartments.

On the other hand it will also be possible to use other types of apparatus to effectuate the methods as described in the introduction to the description. Thus, the scope of the invention will only be determined by the accompanying claims.

The invention claimed is:

1. Method for fractional crystallisation of an at most partially solidified molten metal, comprising:
   introducing the at most partially solidified molten metal into a chamber with a lower wall and an upper wall and divided into a series of compartments communicating with each other, wherein the introduced at most partially solidified molten metal optionally comprises crystals,
   stirring the metal in at least some of the compartments,
   forming crystals in a layer of the metal in the compartments, and
   wherein crystals in the layer of the metal in the compartments are selectively transported in a predetermined direction and molten metal is selectively transported in the opposite direction;
   wherein the method refines aluminum,
   wherein a temperature difference is present over the length of the layer of metal, the higher temperature being present at an end of the metal layer to which the crystals are transported.

2. Method according to claim 1, wherein the compartments in the chamber are formed by compartment walls present in pairs, one wall extending towards and adjacent to the lower wall of the chamber and the other wall extending from the lower wall of the chamber towards the upper wall of the chamber.

3. Method according to claim 2, wherein the compartment walls are adjustable such that the ends of the compartment walls are placed nearer to or further from the upper wall and lower wall, respectively, of the chamber.

4. Method according to claim 2, wherein the compartment walls of each pair being preferably placed adjacent to each other.

5. Method according to claim 1, wherein the compartments in the chamber are formed by compartment walls present in pairs, one wall extending from the upper wall of the chamber towards the lower wall of the chamber and the other wall extending towards and adjacent to the upper wall of the chamber.

6. Method according to claim 5, wherein the compartment walls are adjustable such that the ends of the compartment walls are placed nearer to or further from a surface of the layer of metal they extend towards.

7. Method according to claim 1, wherein a layer of transporting liquid is present below and/or above the metal to selectively transport the crystals, and the compartments in the chamber are formed by compartment walls extending towards and adjacent to the layer of transporting liquid.

8. Method according to claim 1, wherein the lower wall of the chamber is inclined, and the compartments are formed by compartment walls extending towards and adjacent to the lower wall of the chamber.

9. Method according to claim 1, wherein the upper wall is inclined, and the compartments are formed by compartment walls extending towards and adjacent to the upper wall of the chamber.

10. Method according to claim 1, wherein mixing means are present to stir the metal in at least some of the compartments, the mixing velocity of the mixing means being variable.

11. Method according to claim 1, wherein molten metal and/or crystals are removed at the end of the layer of metal towards which the crystals are selectively transported.

12. Method according to claim 1, wherein said method removes one or more of the elements Cu, Fe, Ga, Mg, Mn, B, Si, Sn, Zn, and Ni from the aluminum.

13. Method according to claim 1, wherein the compartments are formed by compartment walls present in pairs, the compartment walls of each pair being placed adjacent to each other, one wall extending from the upper surface of the layer of metal towards the lower surface of the layer of metal and the other wall extending towards and adjacent to the upper surface of the layer of metal.

14. Method according to claim 1, wherein a layer of transporting liquid is present below and/or above the layer of metal to selectively transport the crystals, and the compartments are formed by compartment walls extending towards and adjacent to the layer of transporting liquid transporting the crystals, the transporting liquid being a molten salt.

15. Method according to claim 1, wherein the method removes Fe from the aluminum.

16. Method for fractional crystallisation of an at most partially solidified molten metal, comprising:
- introducing the at most partially solidified molten metal into a chamber with a lower wall and an upper wall and divided into a series of compartments communicating with each other, wherein the introduced at most partially solidified molten metal optionally comprises crystals,
- stirring the metal in at least some of the compartments,
- forming crystals in a layer of the metal in the compartments, and
- wherein crystals in the layer of the metal in the compartments are selectively transported in a predetermined direction and molten metal is selectively transported in the opposite direction;
- wherein the method refines aluminum,
- wherein a temperature difference is present over the length of the layer of metal, the higher temperature being present at a first end of the chamber to which the crystals are transported and a lower temperature being present at a second end of the chamber to which the molten metal is transported,
- wherein the temperature in a first said compartment closer to the first end is higher than a second said compartment relatively closer than the first compartment to the second end,
- wherein, the crystals formed and/or existing in the layer of metal in at least one respective compartment comprise aluminum and Fe while the molten metal in said respective compartment comprises a lower aluminum content than the crystals in said respective compartment and a higher Fe-content than the crystals in said respective compartment.

17. Method for fractional crystallisation of an at most partially solidified molten metal, comprising:
- dividing a layer of at most partially solidified molten metal having an upper surface and a lower surface into a series of compartments communicating with each other,
- stirring the metal in at least some of the compartments,
- forming crystals within the layer of metal, and
- wherein crystals in the layer of metal in the compartments are selectively transported in a predetermined direction and molten metal is selectively transported in the opposite direction,
- wherein a layer of transporting liquid is present below and/or above the layer of metal to selectively transport the crystals, and the compartments in the layer of metal are formed by compartment walls extending towards and adjacent to the layer of transporting liquid transporting the crystals, the transporting liquid being a molten salt.

18. Method for fractional crystallisation of an at most partially solidified molten metal, comprising:
- introducing the at most partially solidified molten metal into a chamber with a lower wall and an upper wall and divided into a series of compartments communicating with each other, wherein the introduced at most partially solidified molten metal optionally comprises crystals,
- stirring the metal in at least some of the compartments,
- forming crystals in a layer of the metal in the compartments, and
- wherein crystals in the layer of the metal in the compartments are selectively transported in a predetermined direction and molten metal is selectively transported in the opposite direction;
- wherein a temperature difference is present over the length of the layer of metal, the higher temperature being present at an end of the metal layer to which the crystals are transported.

* * * * *